3,442,304
FILLING APPARATUS
Gerhart A. Guckel, Los Altos, and Ezra E. Theys, San Mateo, Calif., assignors to James Dole Engineering Co., San Francisco, Calif., a corporation of Nevada
Filed Apr. 28, 1966, Ser. No. 545,935
Int. Cl. B65b 43/00
U.S. Cl. 141—134     8 Claims

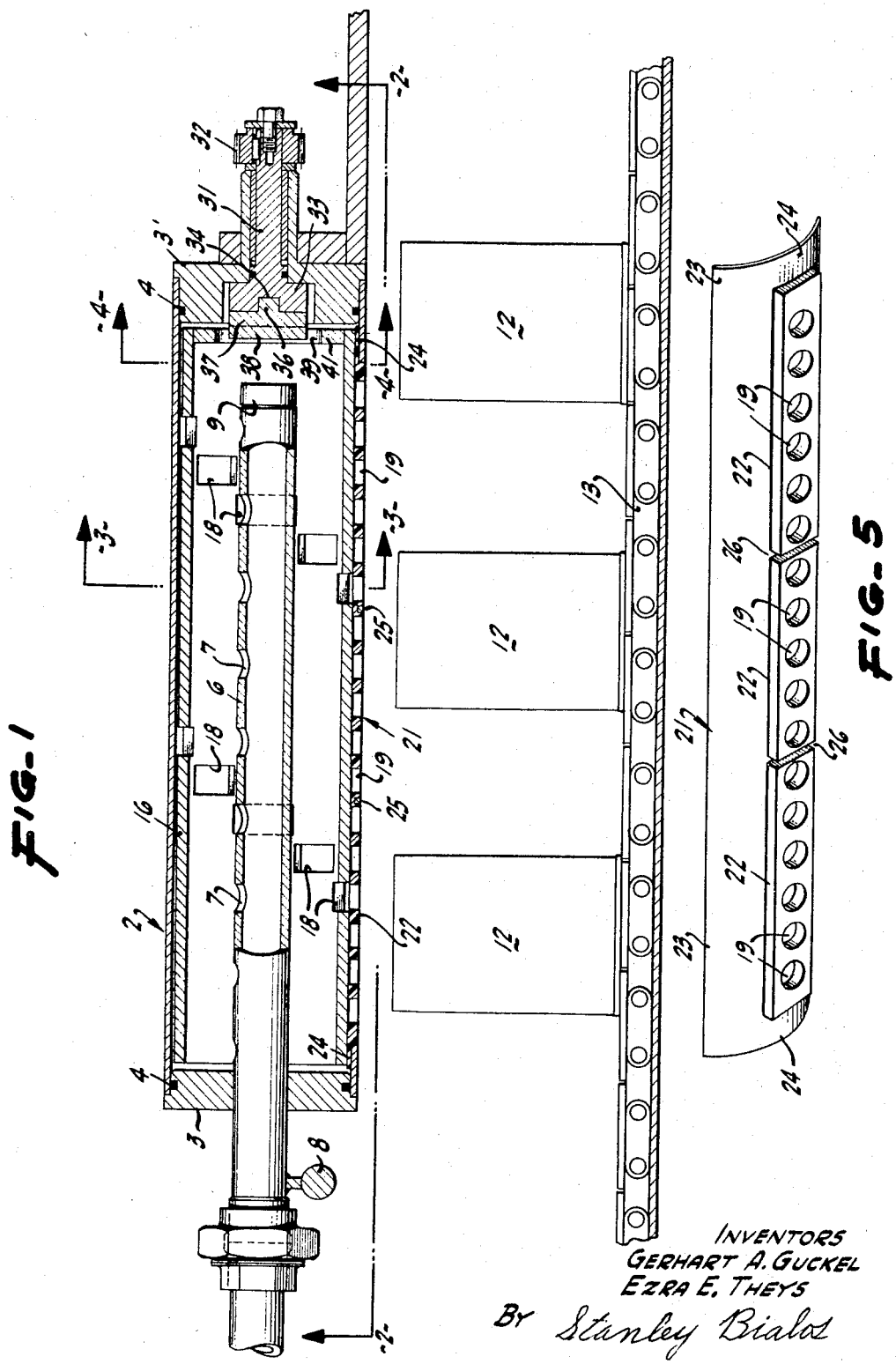

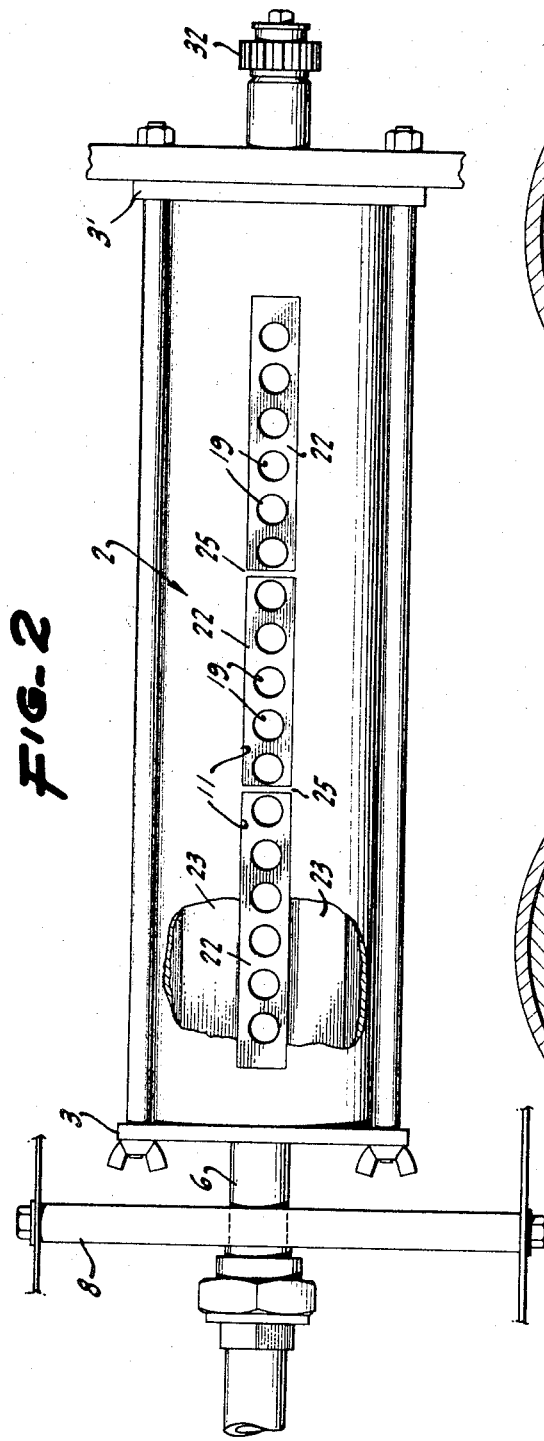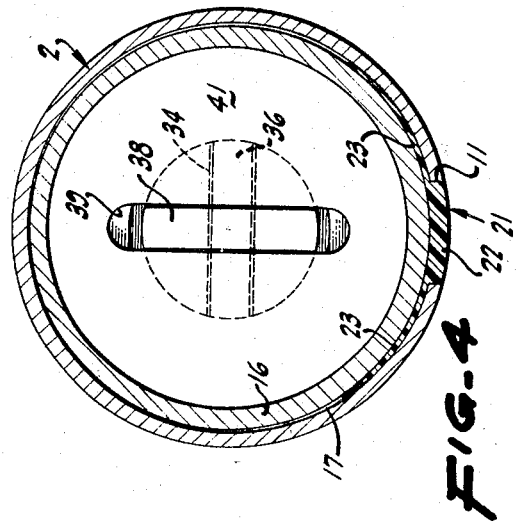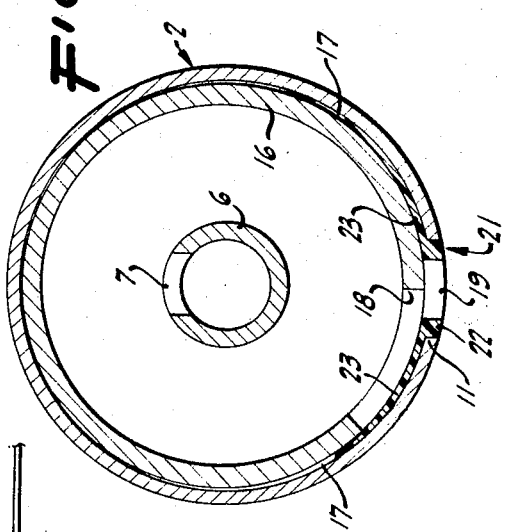

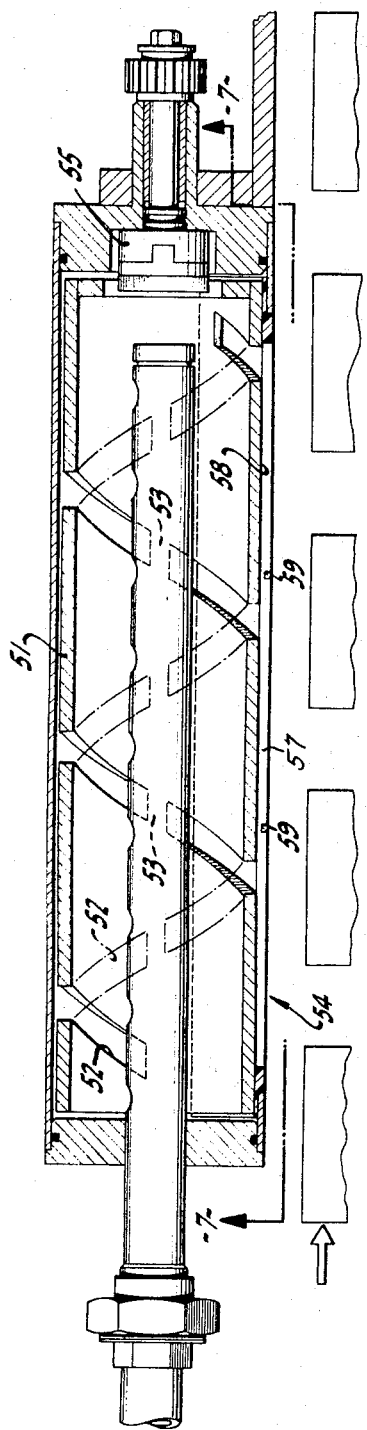
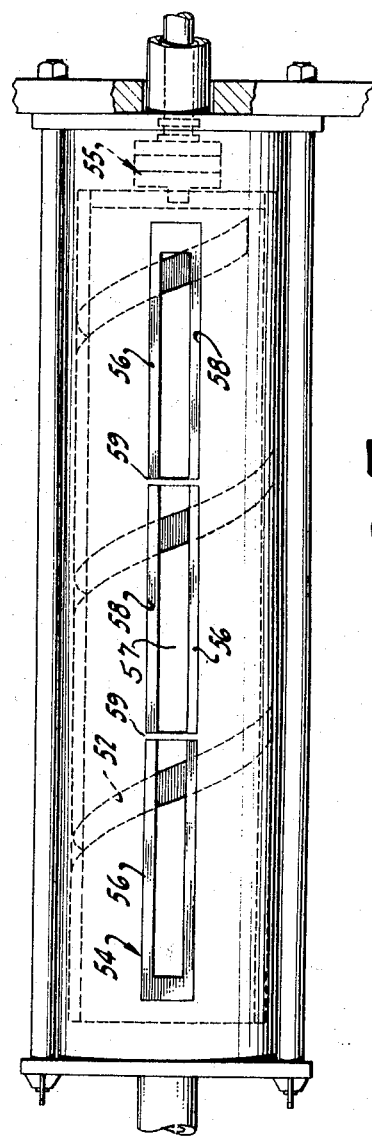
FIG-6
FIG-7
INVENTORS
GERHART A. GUCKEL
EZRA E. THEYS
By Stanley Bialos
ATTORNEY

United States Patent Office 3,442,304
Patented May 6, 1969

ABSTRACT OF THE DISCLOSURE

In a rotary-type product filling apparatus comprising a ported rotor valve within a cylindrical casing having a lengthwise extending product discharge slot, a self-lubricating seal of yieldable flexible plastic material is positioned between the casing wall and the valve. The seal has an integral ported plug keyed in the slot, which holds the seal in position.

---

This invention relates to the filling of a product in containers, and more particularly to the type of filling apparatus wherein a ported cylindrical filler casing contains a ported cylindrical rotor value which is rotatable about the axis of the casing for controlling continuous flow of product into a series of containers which are conveyed past the casing and into which the product is continuously filled.

In apparatus of such character, as exemplified in assignee's U.S. patents to Guckel No. 2,827,928, dated Mar. 25, 1958, and to Martin et al., No. 2,631,768, dated Mar. 17, 1953, the ported cylindrical rotor valve is piloted in bearings and has to seal over the ported part of the casing to preclude leakage and thus maintain accurate filling. This necessitates accurate machining of the bearing supporting the rotor valve, but nevertheless binding of the rotor valve may occur in instances where particles of product foul up the bearings or when the product being filled is hot.

Summarizing the invention hereof, it overcomes the foregoing problems of binding of the bearings, and leakage which impairs accurate filling. This is accomplished by providing a seal of flexible, yieldable, and self-lubricating, packing material supported by the casing over the ported part thereof between the casing and the rotor valve upon which the weight of the rotor valve is floatingly supported; the seal being in the form of an insert which is ported in line with the ported part of the casing to allow discharge of produce from the filler. A flexible drive coupling is connected to the rotor valve to enable it to be rotated while floatingly supported on the seal insert. As a result, the rotor valve wears itself in on the packing seal because of its floating mounting thereon to thus provide at all times a tight seal obviating leakage; and the flexible drive coupling permits the floating mounting to obtain.

From the preceding, it is seen that the invention has as its objects, among others, the provision of an improved supporting and sealing structure for a rotor valve of the character described, which obviates leakage, the necessity of accurate bearings for supporting the valve, binding of the valve, and which at the same time is of simple and economical construction. Other objects of the invention will become apparent from the following more detailed description, and accompanying drawings in which:

FIG. 1 is a vertical, longitudinal cross-sectional view of the type of filler illustrated in the aforementioned Patent No. 2,827,928, and illustrating a series of containers being conveyed below the filler;

FIG. 2 is a bottom plan view of the filler shown in FIG. 1, looking in the direction indicated by line 2—2 in FIG. 1; a portion of the structure being broken away to disclose the construction more clearly;

FIG. 3 is a transverse vertical section taken in a plane indicated by line 3—3 in FIG. 1;

FIG. 4 is a transverse vertical section taken in a plane indicated by line 4—4 in FIG. 1;

FIG. 5 is an isometric view of the packing seal;

FIG. 6 is a vertical longitudinal section of another embodiment of the invention comprising an helical slotted cylindrical control valve of the type illustrated in aforementioned Patent No. 2,631,768; the phantom line illustration of the helical slot depicting that portion of the slot in the half of the cylindrical rotor valve which does not show in the view; and FIG. 7 is a bottom plan view of the filler shown in FIG. 6, looking in the direction indicated by line 7—7 in FIG. 6.

With reference to the embodiment of FIGS. 1 through 5, the filler comprises an elongated substantially cylindrical filler casing, desirably of stainless steel, which is sealed at the left end appearing in FIG. 1 by means of removably secured sealing plate 3; and at its right end casing 2 is sealingly, but removably, telescoped over plate 3' which forms part of a framework for supporting the casing at its right end, sealing O-rings 4 being provided in plates 3 and 3'.

Extending through and sealingly supported on sealing plate 3, is a product distributing conduit or pipe 6, also desirably of stainless steel, having a plurality of spaced ports 7 for introducing product into the filler; the distributor pipe being supported outside casing 2 on a bracket 8 to thus support the left end of the casing. As is described in Patent 2,827,928, product is supplied to the filler at a substantially constant volume per unit of time. A cap 9 is removably screwed onto the inner end of distributor pipe 6 to enable cleaning of the interior of the pipe upon removal of the cap when so desired.

The bottom of casing 2 is ported in a lengthwise direction substantially the entire length of the casing by means of a substantially uninterrupted slot 11 extending lengthwise of the casing, which allows discharge of product from the casing into a series of spaced containers 12 which are continuously moved at such constant rate by conveyor 13 that the containers are uniformly filled as they pass by the filler.

An elongated ported cylindrical rotor control valve 16, also desirably of stainless steel, is positioned loosely within the casing as indicated by the space 17 about the rotor. As in aforementioned Patent 2,827,928, such valve is provided with a series of individual staggered offset ports 18 which as the control valve is continuously rotated, control flow of product, which is usually a liquid or liquiform product, in a plurality of successive intermittent bodily fixed streams at spaced intervals along the length of the filler through spaced ports 19 in elongated packing seal 21 supported over the ported part 11 of the casing. Ports 19 in the seal are in line with ported part 11 of the casing.

The seal can be of any suitable type of yieldable, flexible packing material, which is deformable, so that when the weight of rotor valve 16 is floatingly supported on the seal, it will take a set to conform to the cylindrical surface of rotor valve 16, and thus form a tight seal precluding leakage. Advantageously, the seal is of self-lubricating material to offer minimum frictional drag to rotor valve 16, as it rotates thereon. Desirably, the packing seal of molded "Teflon" (tetrafluoroethylene resin by Du Pont). Other suitable materials are resin-impregnated fabrics having well known types of slip additives incorporated therein, molded silicone resins, and molded polyethylene with slip additives to provide self-lubricating properties. Molded "Teflon" is preferred because of its well-known low frictional drag and self-lubricating properties. Moreover, it is desirable in cases where the filler is to be employed for food products because of its inertness to such products.

As can be seen, particularly from FIGS. 3, 4 and 5 seal 21, is integrally molded and is preformed to a generally arcuate transverse shape. It comprises a relatively thick longitudinally extending plug 22 containing the spaced ports 19, and which fits snugly but removably in the substantially uninterrupted discharge slot 11 in casing 2 thus effectively sealing the slot against leakage. Also, plug 22 serves as a key to hold seal 21 in fixed position as rotor valve 16 is rotated.

Extending laterally from each side of plug 22 is a relatively thin seating wing 23 which conforms to the shape of the inner surface of casing 2 adjacent slot 11. The thickness of wings 23 is not critical but they should be thin enough to flex to the contour of the casing. About 1/16 in. in thickness is preferable. As the seal wears in, these wings provide a seal at the sides of slot 11 while providing good bearing support for floatingly supporting the entire weight of cylindrical control valve 16. Similar relatively thin seating wings 24 extend from adjacent the ends of plug 22. Since the packing seal is preformed it provides an insert that can be placed in position as a unit in casing 2.

Desirably, as illustrated in FIGS. 1, 2 and 5, casing 2 is provided at relatively widely spaced locations with narrow bridge members 25 extending transversely across casing slot 11 to provide support for seal insert 21, the seal being transversely slotted at 26 across plug 22 to receive such bridge supports 25.

A flexible drive connection is provided for continuously rotating cylindrical control valve 16 without impeding the floating support of the control valve on the packing seal whereby effective sealing of the seal will be provided as a result of the weight of the valve bearing on the seal. Any suitable flexible drive may be employed for such purpose; and advantageously a conventional cross-bar type flexible coupling is utilized.

With reference to FIGS. 1 and 4, such drive comprises a shaft 31 journalled in suitable bearings on end plate 3′, and which is adapted to be driven from pinion 32 secured to the shaft. At its inner end, shaft 31 is integral with a plate 33 having a cross slot 34 slidably receiving a key 36 on coupling member 37. Another key 38 on coupling member 37, which extends transversely to key 36, is adapted to slide in a slot 39 in a plate 41 secured at the right hand end of rotor valve 16.

When it is desired to clean the filler, which may be necessary from time to time, especially when it is employed for filling food products in containers, this can be readily done by removing casing 2 from end plates 3 and 3′ and removing distributor pipe 6. This enables control valve 16 to be readily removed from the casing; and the sealing insert 21 can be readily removed after the control valve is taken out of casing 2.

In the embodiment of FIGS. 6 and 7, cylindrical control valve 51 is of the type shown in the aforementioned Patent No. 2,631,768, having a helical passage or slot 52 in its wall which, for all practical purposes, is substantially uninterrupted except for relatively small wall portions 53 spaced at relatively long intervals along the length of slot 52 to provide connecting means for maintaining the valve a structurally rigid unit as described in the aforementioned patent. In cooperation with such helical slot 52, the stream of product flows through a substantially uninterrupted slot in the filler casing in the form of a plurality of spaced apart branches which move continuously in one general direction, as described in such patent.

The floating support of cylindrical control valve 51 on sealing insert 54, and the flexible drive at 55, are the same as that described with respect to the previous embodiment. Also, seal 54 is substantially the same as seal member 21 previously described, except that instead of the ported plug part 56, thereof being formed as spaced ports 19, such ported plug part 56 includes a substantially uninterrupted slot 57 in line with substantially uninterrupted slot 58 in the filler casing in which plug 56 fits. To enhance support of seal 54 intermediate the ends, transverse, narrow bridge elements 59 extend across casing slot 58 in the manner previously described.

We claim:

1. Filling apparatus comprising a cylindrical filler casing having a slot extending in a lengthwise direction to allow discharge of product from the casing, a ported cylindrical rotor valve within the casing and rotatable about the axis of the casing for controlling flow of product into a series of containers which are conveyed past said casing, and a seal of flexible packing material in engagement with said rotor valve and supported by said casing over the slot thereof between said casing and said rotor valve, said seal being ported in line with the slot to allow discharge of product, the ported part of the seal comprising an integral plug which serves as a key to hold the seal in position in the slot as the rotor valve rotates in engagement with the seal, and the rotor valve being floatingly supported by said seal.

2. The apparatus of claim 1 wherein the seal has a wing extending laterally from each side of said plug.

3. The apparatus of claim 2 wherein the seal is generally arcuate in transverse shape and of molded plastic material.

4. The apparatus of claim 2 wherein the ported cylindrical rotor valve comprises a helical substantially continuous passage, and the ported plug of the seal comprises a substantially uninterrupted slot.

5. The apparatus of claim 2 wherein the rotor valve is removably mounted in the casing, and the seal is an insert removably mounted in the casing.

6. An elongated seal of flexible packing material for insertion between (a) a cylindrical filler casing which is ported in a lengthwise direction to allow discharge of product from the casing and (b) a ported rotor valve within and rotatable about the axis of the casing for controlling flow of product from the casing; comprising a relatively thick ported plug part extending generally longitudinally of the seal, a relatively thin seating wing extending laterally from each side of the plug part, and a relatively thin seating wing extending from each end of the plug part, the seal being generally arcuate transversely.

7. The seal of claim 6 which is of integrally molded, self-lubricating plastic material, and has spaced discharge ports in said plug part.

8. The seal of claim 6 which is of integrally molded, self-lubricating plastic material, and has a substantially uninterrupted discharge slot in said plug.

References Cited

UNITED STATES PATENTS

| | | | |
|---|---|---|---|
| 3,072,303 | 1/1963 | Monk | 141—134 X |
| 3,304,135 | 2/1967 | Hasselmark | 308—238 X |

HOUSTON S. BELL, JR., *Primary Examiner.*

U.S. Cl. X.R.

137—625.46; 222—485, 542